2,866,819

STABILIZATION OF SALTS OF SORBIC ACID USING CITRIC ACID

Amelio E. Montagna, South Charleston, and Everett R. Lashley, Charleston, W. Va., assignors to Union Carbide Corporation, a corporation of New York No Drawing. Application February 4, 1957
Serial No. 637,857

16 Claims. (Cl. 260—526)

This invention is directed to chemical processes in the product thereof. More particularly, it is directed to the stabilization of salts of sorbic acid by the use of citric acid.

Many potential uses of sorbic acid require the acid in the form of its water-soluble salt. Aqueous solutions of such salts are convenient to make as well as use and can be transported readily. Such solutions of aqueous salts, however, have a strong tendency to darken and discolor upon normal storage. This darkening is undesirable, particularly when the acid is to be used in foods, and is indicative of deterioration.

We have now discovered that the deterioration and attendant discoloration of aqueous solutions can be effectively inhibited by the addition to such solutions of small quantities of citric acid. The precise mechanism by which this inhibition is achieved is not fully understood. We have, however, tested a number of the common antioxidants or inhibitors for this purpose and found most to be totally ineffective and the rest distinctly inferior to citric acid.

An important advantage of the use of citric acid according to our invention derives from the fact that citric acid is completely safe as an additive to foods. Sorbic acid has wide application in foods as a fungistat and preservative. Many of the current and potential uses of sorbic acid in foods require the acid in the form of a water-soluble salt. Obviously, discoloration and darkening of these salts is highly undesirable in food applications. It is imperative that any inhibitor added to sorbic acid salts intended for use in foods be itself completely safe and non-toxic. Citric acid meets these requirements completely, being in fact an important item in the human diet.

According to our invention, citric acid is added to a water-soluble salt of sorbic acid, or a solution of such a salt, in the amount of at least 0.0005 part by weight of citric acid per 100 parts by weight of the sorbate salt. While as much citric acid as desired could be added to the sorbate solution, we have been unable to detect any increased stabilization with amounts above 2.5 parts by weight of citric acid per 100 parts by weight of sorbate. We prefer to add between 0.001 and 0.5 part by weight of citric acid per 100 parts by weight of sorbate. Citric acid is effective in the above proportions regardless of the concentration of the sorbic acid salt in solution. It is effective as an inhibitor in preventing deterioration and darkening of any of the water-soluble salts of sorbic acid, such as sodium sorbate, potassium sorbate, calcium sorbate, lithium sorbate, barium sorbate, rubidium sorbate, cesium sorbate, beryllium sorbate, magnesium sorbate, strontium sorbate and the like.

In the course of our study of the stability of aqueous solutions of sorbic acid salts under various conditions we found that oxygen can cause severe deterioration of such solutions as measured by the development of color. We therefore employed oxygen as a deteriorating agent for accelerated tests of color stability. For the test solution, we employed an aqueous solution consisting of 25 parts by weight of sodium sorbate and 75 parts by weight of water. A light-colored test solution of this composition was prepared from pure sorbic acid which had been recrystallized from water in the presence of decolorizing charcoal. This recrystallized sorbic acid was dissolved in aqueous sodium carbonate solution to yield the aqueous sodium sorbate solution containing 25 parts by weight of sodium sorbate per 75 parts by weight of water. This solution had an initial color of only 15 on the platinum-cobalt scale.

Our accelerated stability tests were made by exposing aqueous sodium sorbate solution containing inhibitors (as well as uninhibited control solutions) to oxygen under stringent conditions. This is done by maintaining the solutions at a temperature of about 100° C. while bubbling oxygen through the solutions for a period of eight hours. As a control, an aqueous solution consisting of twenty-five parts by weight of sodium sorbate and 75 parts by weight of water, as described above, was maintained at a temperature of 100° C. while oxygen was bubbled through it for a period of eight hours. During this time the color of the solution increased from 15 on the platinum-cobalt scale to a color of 12 Gardner.

Example I

An aqueous test solution consisting of 25 parts by weight of sodium sorbate and 75 parts by weight of water was employed. To this solution was added 0.004 part by weight of citric acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 300 on the platinum-cobalt scale.

Example II

An aqueous test solution consisting of 25 parts by weight of sodium sorbate and 75 parts by weight of water was employed. To this solution was added 0.04 part by weight of citric acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 200 on the platinum-cobalt scale.

Example III

An aqueous test solution consisting of 25 parts by weight of sodium sorbate and 75 parts by weight of water was employed. To this solution was added 0.4 part by weight of citric acid per 100 parts by weight of sodium sorbate. The inhibited solution thus obtained was maintained at a temperature of 100° C. while oxygen was bubbled through it for a period of eight hours. During this time the color increased from 15 on the platinum-cobalt scale to only 200 on the platinum-cobalt scale.

What is claimed is:

1. A stabilized solution of a salt of sorbic acid comprising a water-soluble salt of sorbic acid, water and at least 0.0005 part by weight of citric acid per 100 parts by weight of said salt of sorbic acid.

2. A stabilized solution of a salt of sorbic acid comprising a water-soluble salt of sorbic acid, water and from 0.001 to 0.5 part by weight of citric acid per 100 parts by weight of said salt of sorbic acid.

3. A stabilized solution of the sodium salt of sorbic acid comprising sodium sorbate, water and at least 0.0005 part by weight of citric acid per 100 parts by weight of sodium sorbate.

4. A stabilized solution of the sodium salt of sorbic acid comprising sodium sorbate, water and from 0.001 to 0.5 part by weight of citric acid per 100 parts by weight of sodium sorbate.

5. A stabilized solution of the potassium salt of sorbic acid comprising potassium sorbate, water and at least 0.0005 part by weight of citric acid per 100 parts by weight of potassium sorbate.

6. A stabilized solution of the lithium salt of sorbic acid comprising lithium sorbate, water and at least 0.0005 part by weight of citric acid per 100 parts by weight of lithium sorbate.

7. A stabilized solution of the calcium salt of sorbic acid comprising calcium sorbate, water and at least 0.0005 part by weight of citric acid per 100 parts by weight of calcium sorbate.

8. A stabilized solution of the barium salt of sorbic acid comprising barium sorbate, water and at least 0.0005 part by weight of citric acid per 100 parts by weight of barium sorbate.

9. A process for stabilizing an aqueous solution of a salt of sorbic acid which comprises adding to said solution at least 0.0005 part by weight of citric acid per 100 parts of said salt of sorbic acid.

10. A process for stabilizing an aqueous solution of a salt of sorbic acid which comprises adding to said solution from 0.001 to 0.5 part by weight of citric acid per 100 parts of said salt of sorbic acid.

11. A process for stabilizing an aqueous solution of sodium sorbate which comprises adding to said solution at least 0.0005 part by weight of citric acid per 100 parts of sodium sorbate.

12. A process for stabilizing an aqueous solution of sodium sorbate which comprises adding to said solution from 0.001 to 0.5 part by weight of citric acid per 100 parts of sodium sorbate.

13. A process for stabilizing an aqueous solution of potassium sorbate which comprises adding to said solution at least 0.0005 part by weight of citric acid per 100 parts of potassium sorbate.

14. A process for stabilizing an aqueous solution of lithium sorbate which comprises adding to said solution at least 0.0005 part by weight of citric acid per 100 parts of lithium sorbate.

15. A process for stabilizing an aqueous solution of calcium sorbate which comprises adding to said solution at least 0.0005 part by weight of citric acid per 100 parts of calcium sorbate.

16. A process for stabilizing an aqueous solution of barium sorbate which comprises adding to said solution at least 0.0005 part by weight of citric acid per 100 parts of barium sorbate.

References Cited in the file of this patent

UNITED STATES PATENTS

| | | |
|---|---|---|
| 2,485,633 | Gooding et al. | Oct. 25, 1949 |
| 2,699,395 | Brown et al. | Jan. 11, 1955 |

OTHER REFERENCES

Lips: Chem. Abs., vol. 44 (1950) col. 1618.
Fryklof: Chem. Abs., vol. 48 (1954) col. 8486.